US 8,112,254 B1

(12) United States Patent
Bhat et al.

(10) Patent No.: US 8,112,254 B1
(45) Date of Patent: Feb. 7, 2012

(54) TRANSFERRING SURFACE ATTRIBUTES ACROSS GEOMETRIC MODELS

(75) Inventors: Kiran S. Bhat, San Francisco, CA (US); Cary Phillips, Moss Beach, CA (US)

(73) Assignee: Lucasfilm Entertainment Company Ltd., San Francisco, CA (US)

(*) Notice: Subject to any disclaimer, the term of this patent is extended or adjusted under 35 U.S.C. 154(b) by 599 days.

(21) Appl. No.: 12/113,585

(22) Filed: May 1, 2008

(51) Int. Cl.
*G06F 17/50* (2006.01)
(52) U.S. Cl. .......................................... 703/1
(58) Field of Classification Search .................. None
See application file for complete search history.

(56) References Cited

U.S. PATENT DOCUMENTS

| 7,196,702 | B1* | 3/2007 | Lee et al. ............... 345/419 |
| 2004/0085311 | A1* | 5/2004 | Lee et al. ............... 345/419 |
| 2006/0290693 | A1* | 12/2006 | Zhou et al. .............. 345/420 |
| 2009/0225077 | A1* | 9/2009 | Sudarsky et al. ......... 345/423 |

OTHER PUBLICATIONS

Alias Systems, Inc. "Subdivision Surface Modeling, Version 6", 2004, downloaded from the internet at: http://www.cs.washington.edu/education/courses/cse459/06wi/help/mayaguide/Complete/SubDs.pdf on Sep. 19, 2011, 56 pages.
Asirvatham, et al. "Consistent Spherical Parameterization", International Conference on Computational Science, 2005, pp. 265-272.
Kraevoy, et al. "Cross-Parameterization and Compatible Remeshing of 3D Models" ACM Transactions on Graphics (TOG), Proceedings of ACM SIGGRAPH 2004, vol. 23, Issue 3, Aug. 2004, 9 pages.
Side Effects Software, Inc. "Houdini 9.1: Model: Atrributes", Dec. 30, 2008, downloaded from the internet at: http://web.archive.org/web/2008012307502/http:/www.sidefx.com/docs/houdini9.1/model/attributes on Dec. 19, 2011, 2 pages.
SoftImage "Using GATOR to Transfer Attributes Between Dissimilar Objects", Oct. 24, 2005, downloaded from the internet at: http://web.archive.org/web/20060221093546/http://softimage.wiki.avid.com/index.php/Using_GATOR_to_Transfer_Attributes_Between_Dissimilar_Objects on Sep. 19, 2011, 2 pages.
Wikipedia, "3D Computer Graphics", Feb. 24, 2006, downloaded from the internet at: http://web.archive.org/web/20060224201744/http:/en.wikipedia.org/wiki/3D_modelling on Sep. 19, 2011, 5 pages.
Wikipedia "Mental Ray", Oct. 5, 2006, downloaded from the internet at: http://web.archive.org/web/20061011232427/http:/en.wikipedia.org/wiki/Mental_Ray on Sep. 19, 2011, 2 pages.
Wikipedia "Soft Image", Sep. 24, 2006, downloaded from the internet at: http://web.archive.org/web/20061011232615/http:/en.wikipedia.org/wiki/Softimage on Sep. 19, 2011, 2 pages.

* cited by examiner

*Primary Examiner* — David Silver
(74) *Attorney, Agent, or Firm* — Fish & Richardson P.C.

(57) ABSTRACT

The subject matter of this specification can be embodied in, among other things, a system that includes a correspondence generator that determines a distance-based mapping between a set of points in a source object and a point in a target object and stores the distance-based mapping in a surface map. The system also includes an attribute transfer module that transfers surface attributes that determine an appearance or deformation of the set of points in the source object to the point in the target object using the surface map. The system also includes an attribute editor that receives a selection of a region of the target object and applies an interpolation algorithm that determines new values for surface attributes in the selected region from neighboring points in the target object.

20 Claims, 14 Drawing Sheets

TRANSFERRING SURFACE ATTRIBUTES ACROSS GEOMETRIC MODELS

TECHNICAL FIELD

This instant specification relates to the transfer of graphics data in a computer graphics pipeline.

BACKGROUND

As computer processors have increased in computational power, computer graphics designers have been able to create more complex and life-like computer graphic (CG) creatures. Generally, a CG creature consists of a mesh surface composed of thousands of polygons, each formed by numerous vertices. To create the appearance of the CG creature, a designer can assign each of the creature's vertices values known as surface attributes. For example, a designer can assign enveloping weights to each of the creature's vertices to control the deformation of the creature's skin as the creature moves. Other examples of surface attributes include blend shape weights and color and UV coordinates used for texture mapping intricate details to the creature's skin.

In many cases, a team of specialists creates a CG creature. For example, some team members create the geometric shape of the creature, while others focus on the appearance of the creature's surface or the way the creature moves. The team members can work independently and synthesize their results to form the finished CG creature. When a change is made to the creature—for example, when an extra limb is added—the work done by the other team members must be updated to fit the new model, which is often an expensive and time-consuming task.

SUMMARY

In general, this document describes interactively transferring surface attributes across geometric models. First, correspondences between a source model and a target model can be determined. For example, the source and target models may be aligned and a distance-based algorithm can be used to calculate the closest spatial point in the source model for each point in the target model. The resulting correspondences can be stored in a data structure referred to as a surface map. Next, surface attributes may be transferred from the source model to the target model using the surface map. A user can interactively edit incorrectly transferred surface attributes by selectively applying a global interpolation algorithm to error regions in the target model. Subsequently, the surface map can be updated using the corrected surface attributes.

In a first general aspect, a computer-implemented process is described that includes determining a distance-based mapping between a set of points in a source object and a point in a target object, wherein the set of points in the source object includes at least one point. The method also includes storing the distance-based mapping in a surface map, transferring surface attributes that determine an appearance or deformation of the set of points in the source object to the point in the target object using the surface map and displaying at least a portion of the target object after the transfer. The process also includes receiving, from a human user, a selection of a region of the target object where the transfer of the surface attributes resulted in an error in an appearance or deformation of the target object and applying an interpolation algorithm that determines new values for surface attributes in the selected region from neighboring points in the target object in order to correct the error in the appearance or deformation of the target object.

In a second general aspect, a system is described that includes a correspondence generator that determines a distance-based mapping between a set of points in a source object and a point in a target object and stores the distance-based mapping in a surface map, wherein the set of points in the source object includes at least one point. The system also includes an attribute transfer module that transfers surface attributes that determine an appearance or deformation of the set of points in the source object to the point in the target object using the surface map and an attribute editor that receives, from a human user, a selection of a region of the target object where the transfer of the surface attributes resulted in an error in an appearance or deformation of the target object and applies an interpolation algorithm that determines new values for surface attributes in the selected region from neighboring points in the target object in order to correct the error in the appearance or deformation of the target object.

The systems and techniques described here may provide one or more of the following advantages. First, a system can transfer surface attributes between large meshes. Second, a system can transfer attributes between groups of meshes with different topologies and shapes. Third, a user can interactively edit and correct transferred attributes.

The details of one or more embodiments of the transferring surface data across geometric model feature are set forth in the accompanying drawings and the description below. Other features and advantages of the transferring surface data across geometric model feature will be apparent from the description and drawings, and from the claims.

DESCRIPTION OF DRAWINGS

Like reference symbols in the various drawings indicate like elements.

DETAILED DESCRIPTION

This document describes systems and techniques for transferring surface attributes across geometric models having different shapes and topologies. In general, a system allows a computer graphics designer to align a source model with a target model using a graphical user interface. Subsequently, a distance-based computer algorithm can automatically map each vertex in the target model to its closest spatial point in the source model and store the map (known as a surface map) in memory. Using the correspondences stored in the surface map, the system can automatically transfer surface attributes from source model vertices to corresponding target model vertices. The user can interactively correct transferred surface attributes by selectively applying a global interpolation algorithm to regions of the target model. To facilitate the transfer of other surface attributes, the surface map can be updated using the corrected surface attributes.

Figure 1:
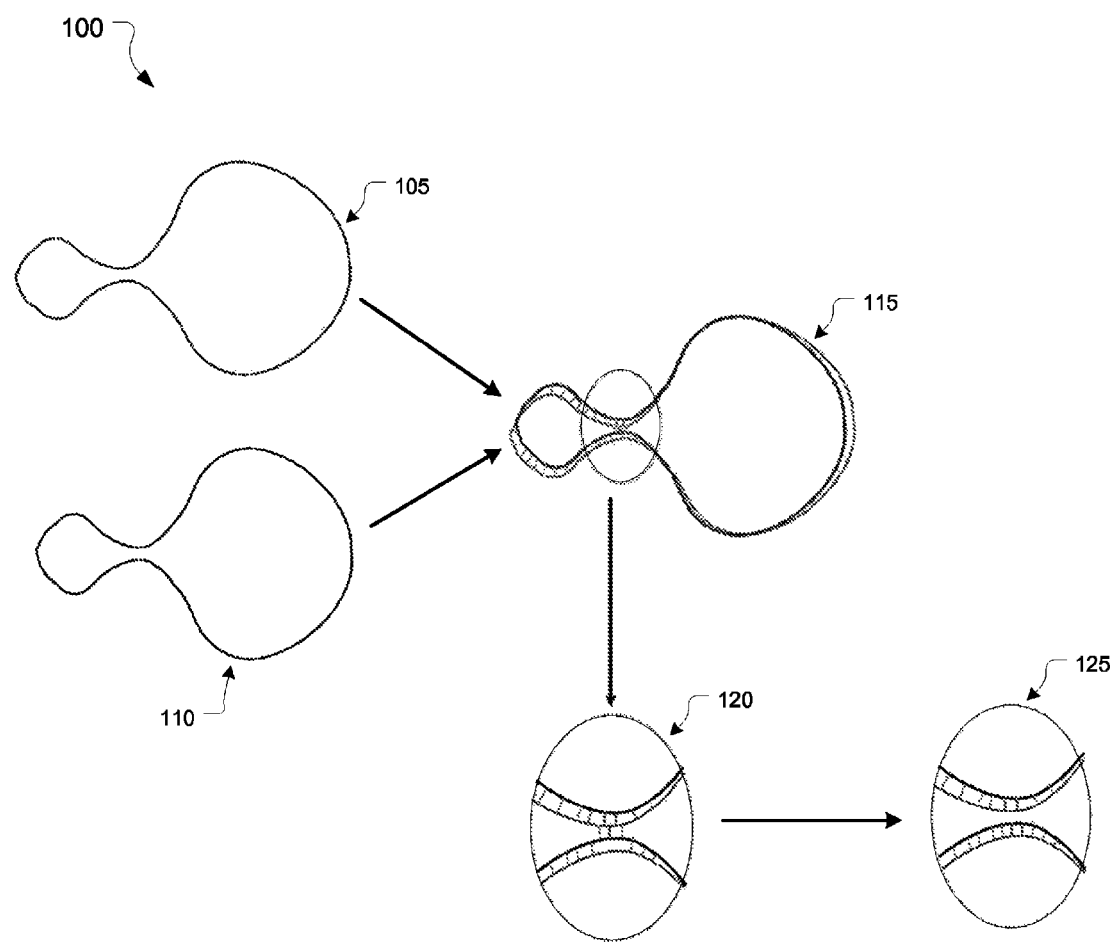
FIG. 1 is a conceptual diagram of an example method for interactively transferring surface attributes across geometric models.

FIG. 1 is a conceptual diagram 100 of an example method for interactively transferring surface attributes across geometric models. The illustrative diagram 100 includes a source object 105 and a target object 110. For ease of illustration, both the source object 105 and the target object 110 are two-dimensional shapes; however, the systems and techniques disclosed are equally applicable to three-dimensional objects.

In an illustrative example, an automated algorithm determines correspondences between points in the source object 105 and the target object 110. The source object 105 and the target object 110 can be automatically aligned or, in some implementations, a user can align the objects. After the objects have been aligned, a distance-based algorithm can calculate the closest spatial point in the source object 105 to each point in the target object 110. The resulting correspondences (also referred to as mappings) can be stored in a data structure referred to as a surface map. In the illustrative example, the lines connecting the aligned source and target objects 115 represent the calculated correspondences.

After the surface map is calculated, surface attribute values assigned to points in the source object 105 can be transferred to corresponding points in the target object 110. For example, each point in the source object 105 may be assigned multiple surface attributes such as colors, UV coordinates, enveloping weights, etc. Surface attribute values associated with the points in the source object 105 can be copied to corresponding points in the target object 110 using the surface map.

The automated algorithm used to calculate the surface map may incorrectly map points in the source object 105 to points in the target object 110. For example, consider a magnified view 120 of a section of the aligned objects 115. As shown in the magnified view 120, the algorithm erroneously mapped points in the lower curve of the source object 105 to points in the upper curve of the target object 110. This mapping may result in the algorithm transferring surface attributes from the source object 105 to the wrong points in the target object 110. To correct this error, a user can interactively apply a global interpolation algorithm to the erroneously mapped portion of the target object 110. The algorithm can use the topology of the target object 110 to locate neighboring target object points to correct the erroneously transferred attributes. Subsequently, the corrected attributes can be used to update the correspondences stored in the surface map, resulting in the corrected mapping shown in a second magnified view 125.

Figure 2:
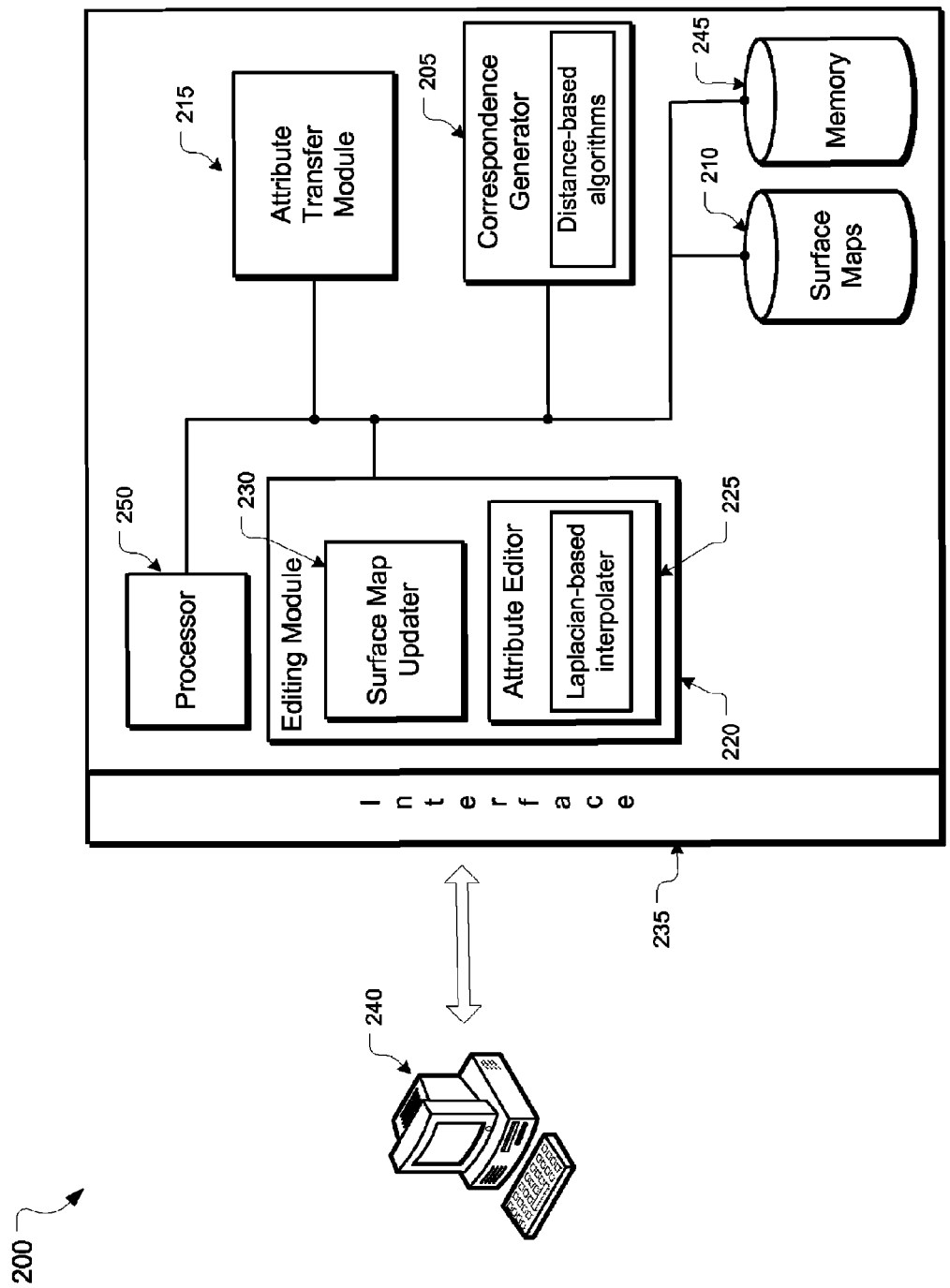
FIG. 2 shows an example system for interactively transferring surface attributes across geometric models.

FIG. 2 shows an example system 200 for interactively transferring surface attributes across geometric models. The system 200 includes a correspondence generator 205 for automatically generating correspondences between source and target models. The generator 205 can automatically align the source and target models or, in some implementations, a user can interactively align the models. Subsequently, the generator 205 can use distance-based algorithms to automatically map each point in the target model to its closest point in the source model. For example, the distance-based algorithm can be a Nearest Neighbor algorithm. In some implementations, for each vertex in a target model, a Nearest Neighbor algorithm can calculate the closest spatial vertex in the source model. In some circumstances, the algorithm may use a spatial data structure such as a binary space partition tree to accelerate the computation by quickly eliminating irrelevant model regions from consideration.

In other implementations, the distance-based algorithm can be a Nearest Point on Surface algorithm. A Nearest Point on Surface algorithm can compute the closest point on the surface of the source model for each vertex in the target model. A Nearest Point on Surface algorithm may produce a more accurate mapping than a Nearest Neighbor algorithm, especially when one of the models has a substantially higher resolution (i.e., more vertices) than the other.

The correspondence generator 205 may store the correspondence information in a data structure known a surface map. In some implementations, the surface map includes the closest point or vertex in the source object for each vertex in the target object. The surface map can be implemented as, for example, an array, linked list, binary tree, etc. For example, the correspondence information can be stored as a sparse array of map objects, each of which can contain a target vertex, corresponding source vertices, and barycentric coordinates for weights. The resulting surface map can be stored in a surface map repository 210.

In various implementations, a user may select the algorithm that the correspondence generator 205 uses to determine correspondences between a source and target model. For example, the user may use a graphical user interface to select either the Nearest Neighbor or Nearest Point on Surface algorithms described above.

The system 200 also includes an attribute transfer module 215. In some implementations, the attribute transfer module 215 can transfer surface attributes from a source model to a target model. For example, the module 215 can use the surface map to determine which source model vertices correspond to each vertex in the target model. Subsequently, the module 215 can linearly blend the surface attributes associated with the corresponding source model vertices and copy the resulting blended surface attribute to the appropriate target model vertex.

The system 200 can also contain an editing module 220. The editing module can correct erroneously transferred surface attributes and update the surface map with corrected correspondence information. The exemplary editing module can contain an attribute editor 225 that can correct erroneously transferred surface attributes. For example, a user can select a region of incorrectly transferred surface attributes in the target model using a graphical user interface. Subsequently, the attribute editor 225 can apply a global interpolation algorithm to fix the incorrectly transferred attributes in the error region. In an illustrative example, the global interpolation algorithm can use Laplace interpolation.

The editing module 220 can also contain a surface map updater 230. The surface map updater 230 can update a surface map with corrected correspondence information. For example, after the attribute editor 225 corrects erroneously transferred surface attributes in a target model, the updater 230 can use the corrected surface attributes to compute new correspondence information that can be subsequently stored in the surface map. The updater 230 can also request that the correspondence generator 205 calculate correspondences between the updated source and target models and store the new correspondence information in the surface map. In some implementations, the updater 230 can calculate correspondences between the updated source and target models and store the new correspondence information in the surface map.

The interface 235 communicates with external input and output devices 240, which can include input devices such as keyboards, pointing devices, and a display unit for displaying graphical user interfaces. For example, the interface 235 may receive alignment data and corrective inputs from a designer using an input device such as a keyboard or pointing device.

The memory 245 stores system data. For example, the memory 245 can be used to store instructions to create and operate a graphical user interface. The memory 245 is also capable of providing storage for the system 200. The memory 245 can store surface attributes, polygon data, etc. In one implementation, the memory 245 is a computer-readable medium. In various different implementations, the memory 245 can be a floppy disk device, a hard disk device, an optical disk device, or a tape device.

The system 200 also includes one or more processors 250. The processor 250 is capable of processing instructions stored in the memory 245 to display graphical information for a user interface on the input/output device 240.

Figure 3A:
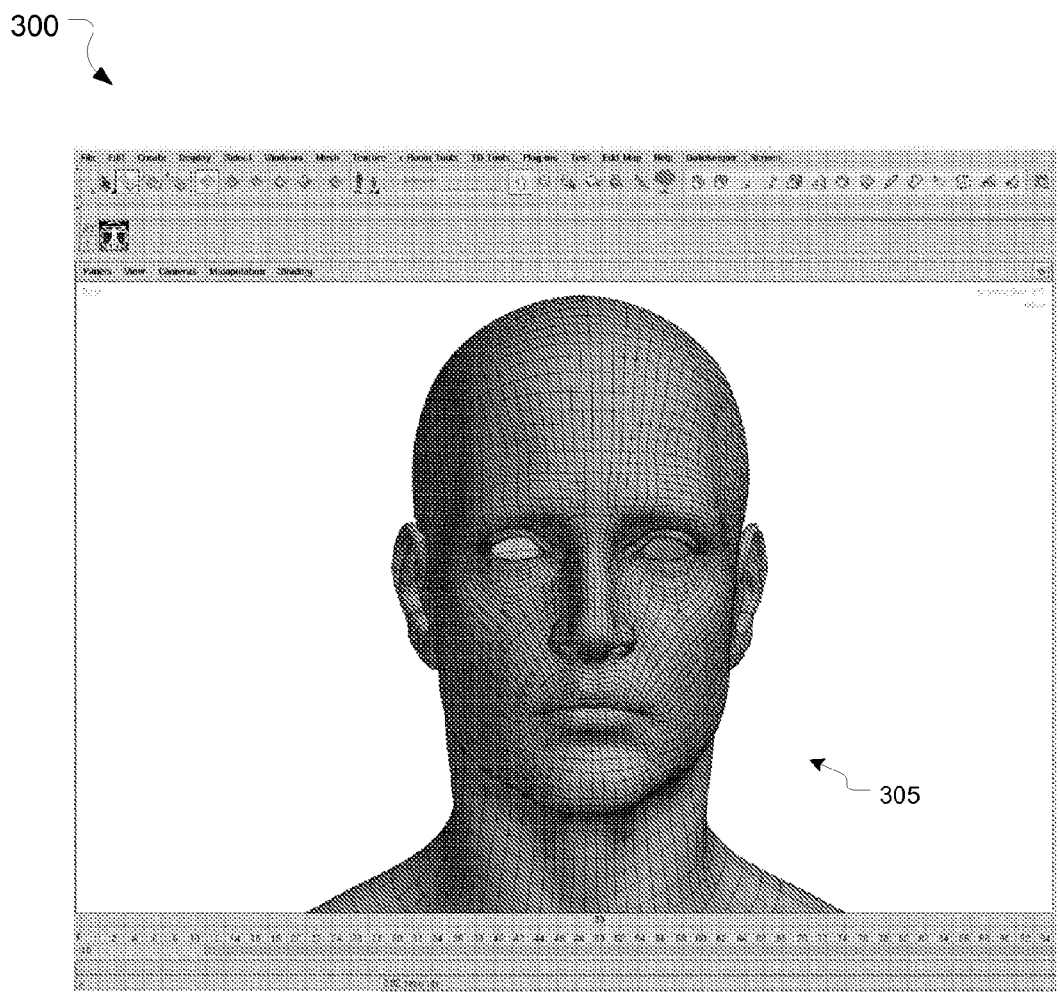
FIGS. 3A-3I are exemplary screenshots of a graphical user interface for interactively transferring surface attributes across geometric models.
Figure 3B:
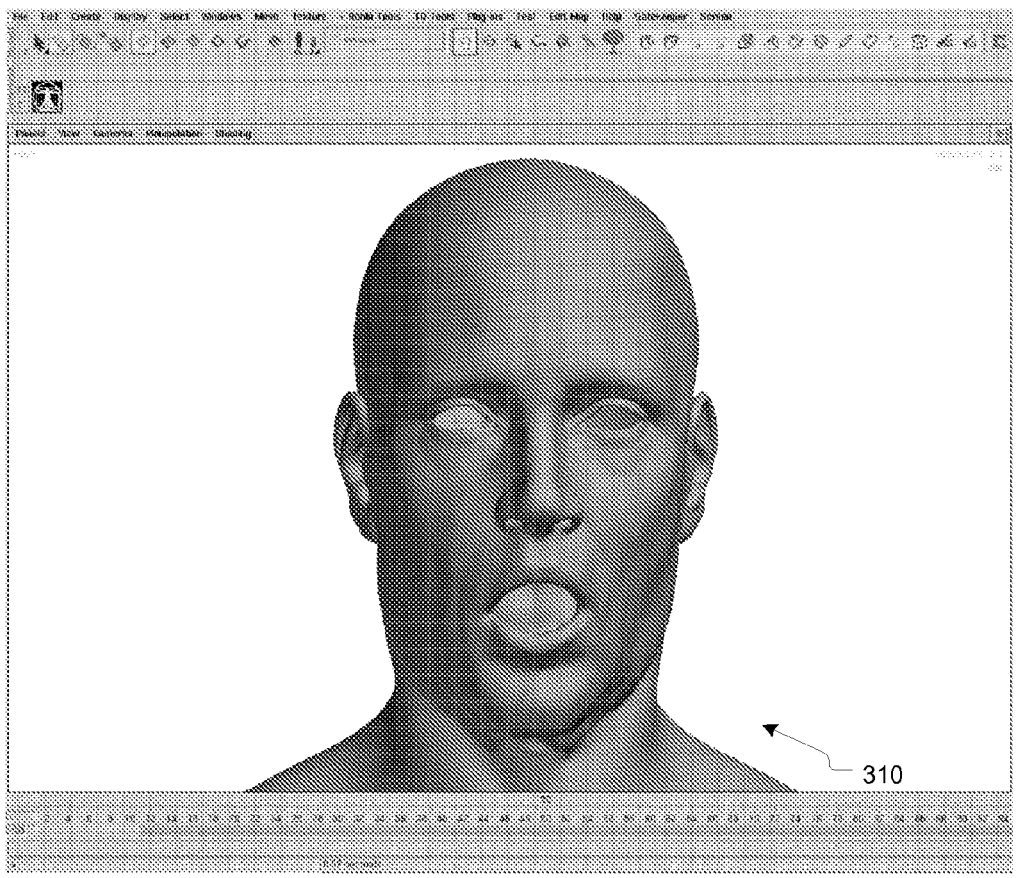
Figure 3C:
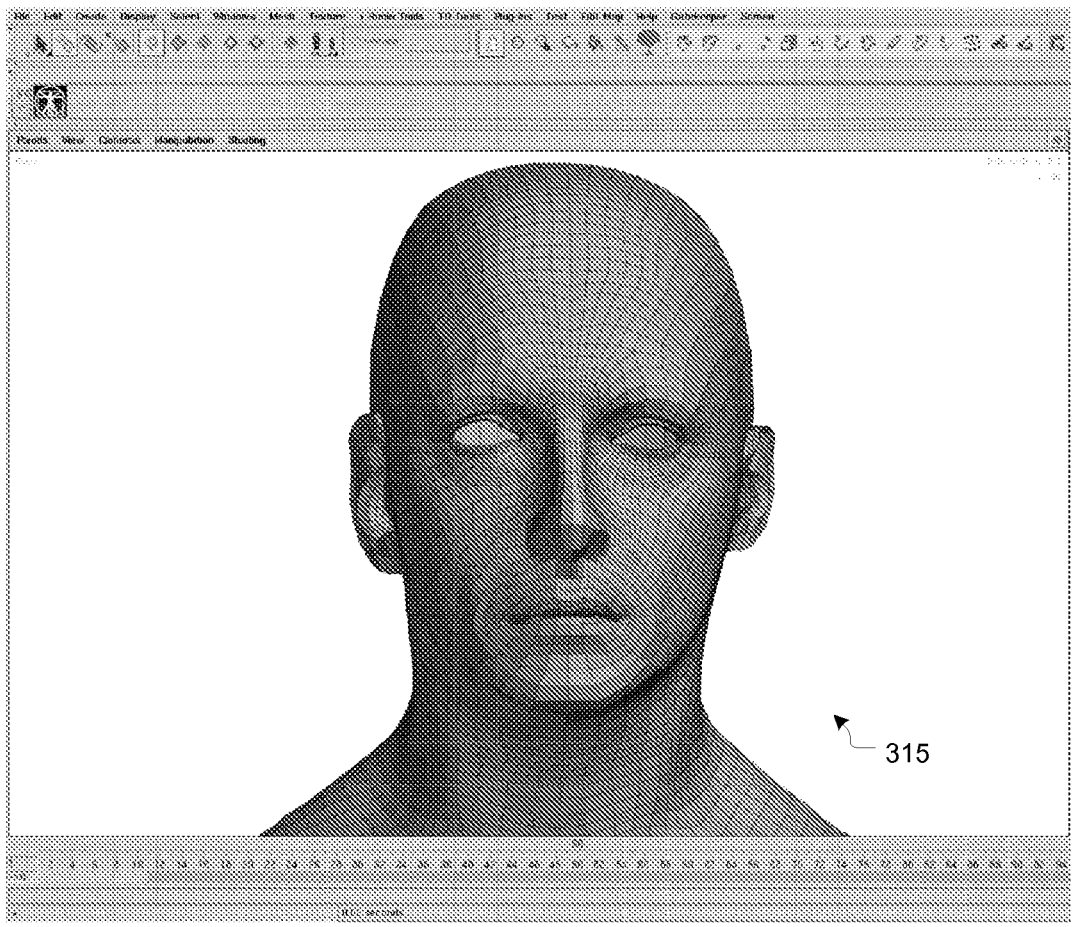

FIGS. 3A-3I are exemplary screenshots of a graphical user interface 300 for interactively transferring surface attributes across geometric models. FIGS. 3A and 3B show the graphical user interface 300 displaying a source model in a neutral expression 305 and a yawning expression 310, respectively. The source model can include numerous vertices, and each vertex can be assigned surface attributes such as a colors, UV coordinates, enveloping weights, blend shape weights, etc. In an illustrative example, a user can use the graphical user interface to map source model expressions such as the neutral expression 305 and the yawning expression 310 to a target model 315 shown in FIG. 3C. In the illustrative example, the target model 315 is in a neutral expression. The target model 315 also lacks a texture map and has a lower resolution (i.e., fewer vertices) than the source model displayed in FIGS. 3A and 3B. In addition, the target model 315 has a slightly different shape than the source model; e.g., the nostril, eyebrows, lips and ears differ in the source and target models as shown in FIGS. 3A and 3C.

To begin the transfer of surface attributes from the source model to the target model 315, the user can create correspondences between source and target model expressions. In an illustrative example, the user can select an algorithm to automatically map each point in the target model 315 (which is in a neutral expression) to its closest point in the source model neutral expression 305. In some implementations, the user can select between Nearest Neighbor and Nearest Point on Surface algorithms to automatically calculate correspondences between vertices in the source and target models. After the correspondences have been calculated, the correspondences can be stored in a surface map.

Figure 3D:
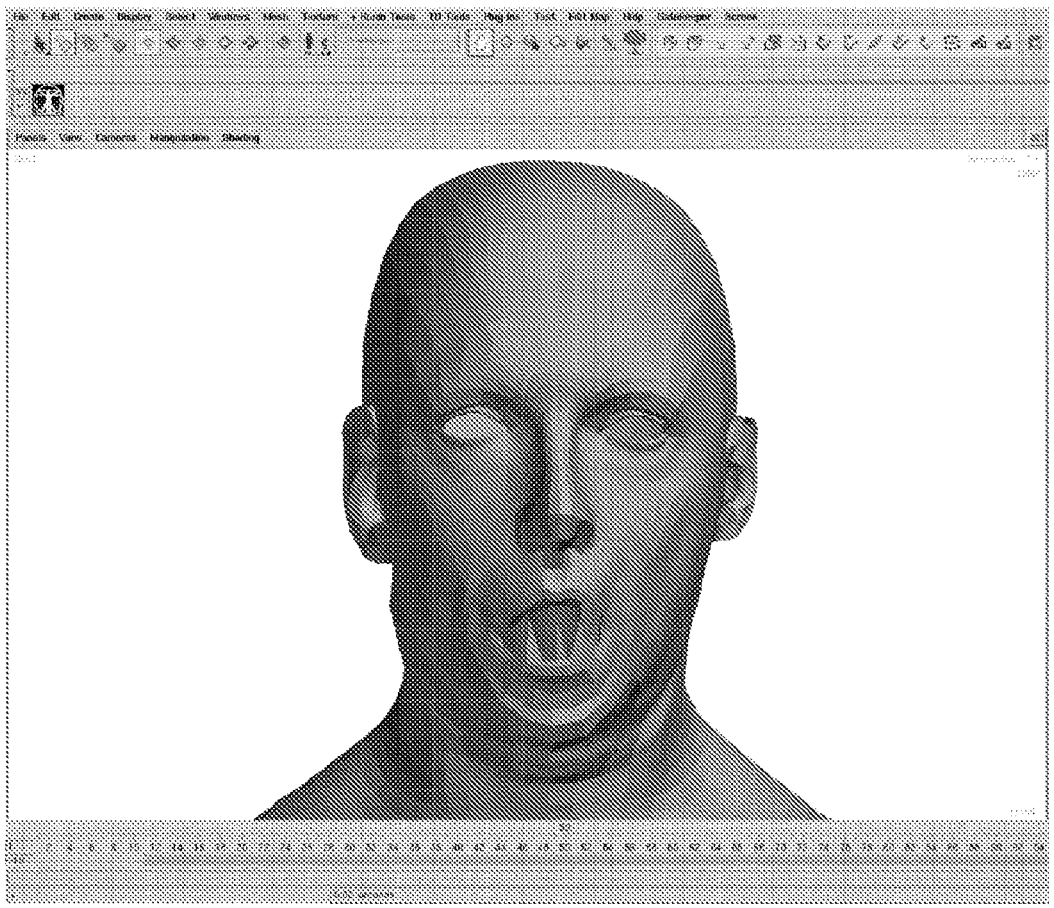

Subsequently, the surface attributes can be transferred using the surface map. For example, using the correspondences stored in the surface map, surface attributes associated with source model vertices can be blended, if necessary, and copied to the appropriate target model vertex. The results of an exemplary surface attribute transfer from the source model yawning expression 310 to the target model 315 are illustrated in FIG. 3D. In the illustrative example, some source model vertices were incorrectly mapped to target model vertices, resulting in errors in the target model. As shown in FIG. 3D, vertices in the upper lip of the target model 315 have been erroneously mapped to vertices in the bottom lip of the target model 315, creating errors in the lip region of the transferred expression.

Figure 3E:
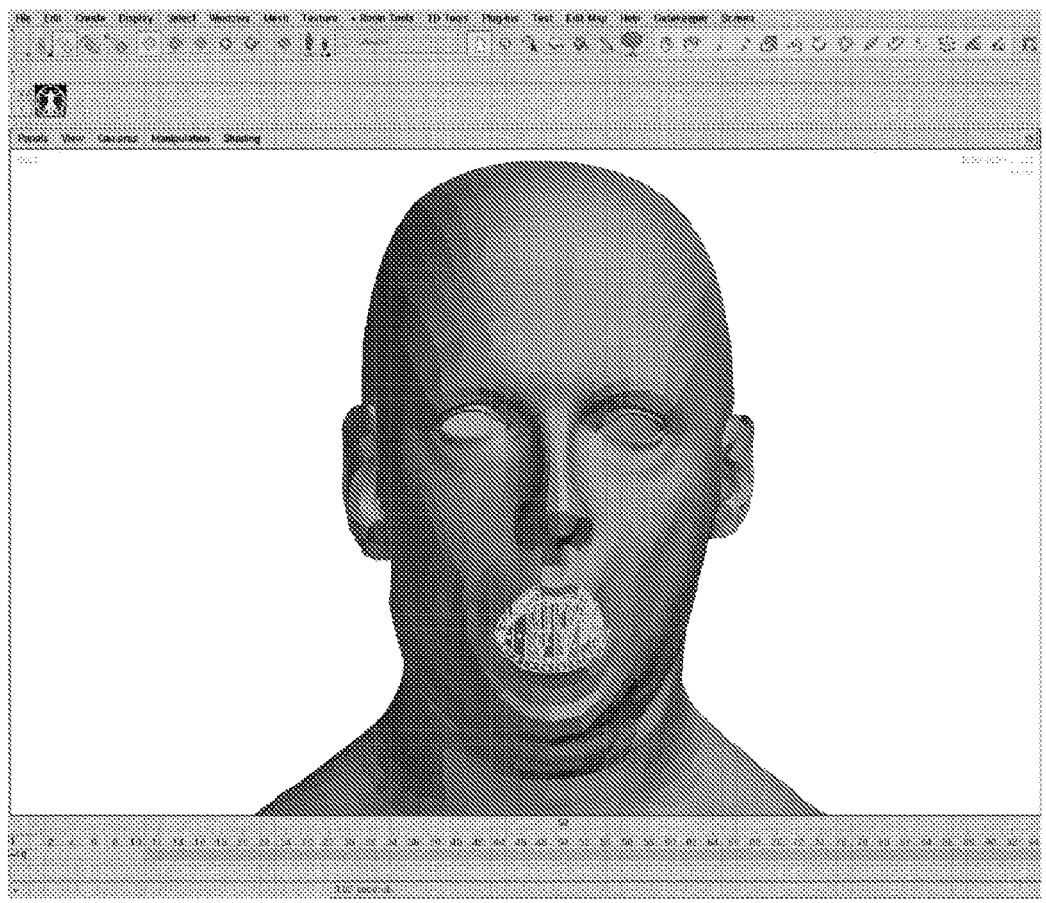
Figure 3F:
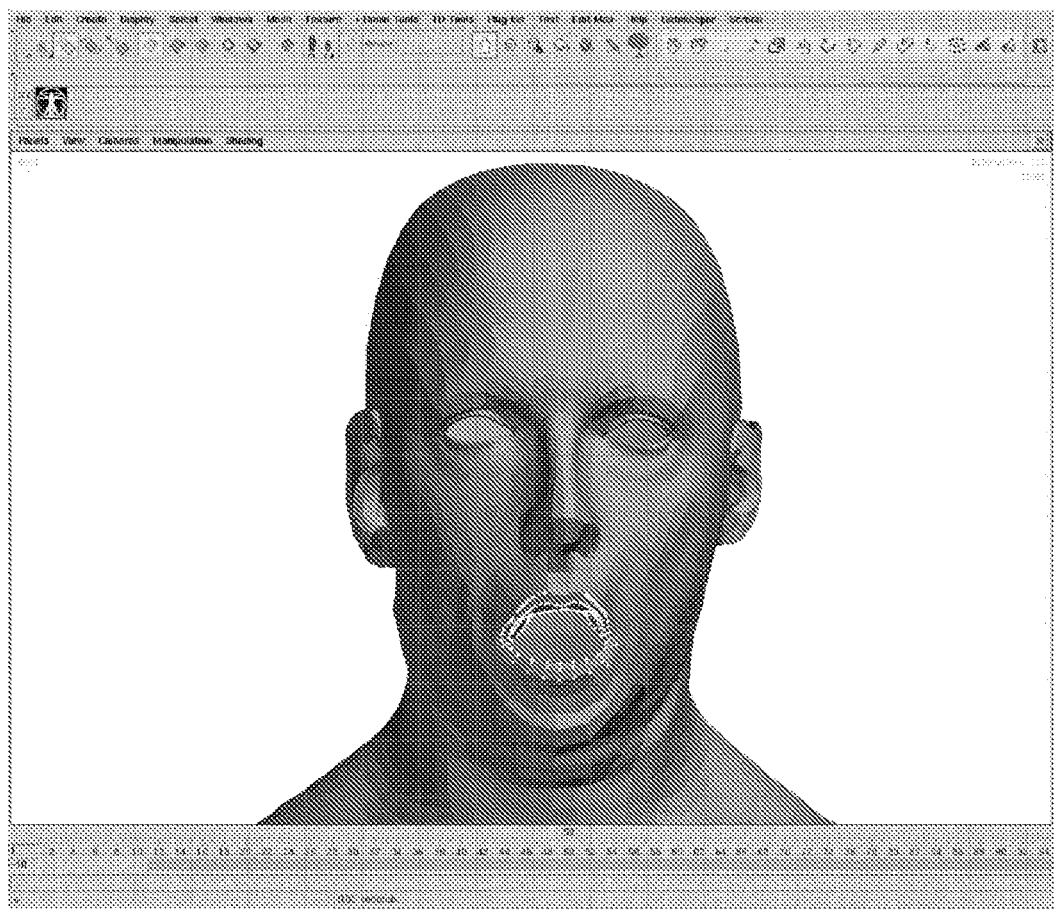
Figure 3G:
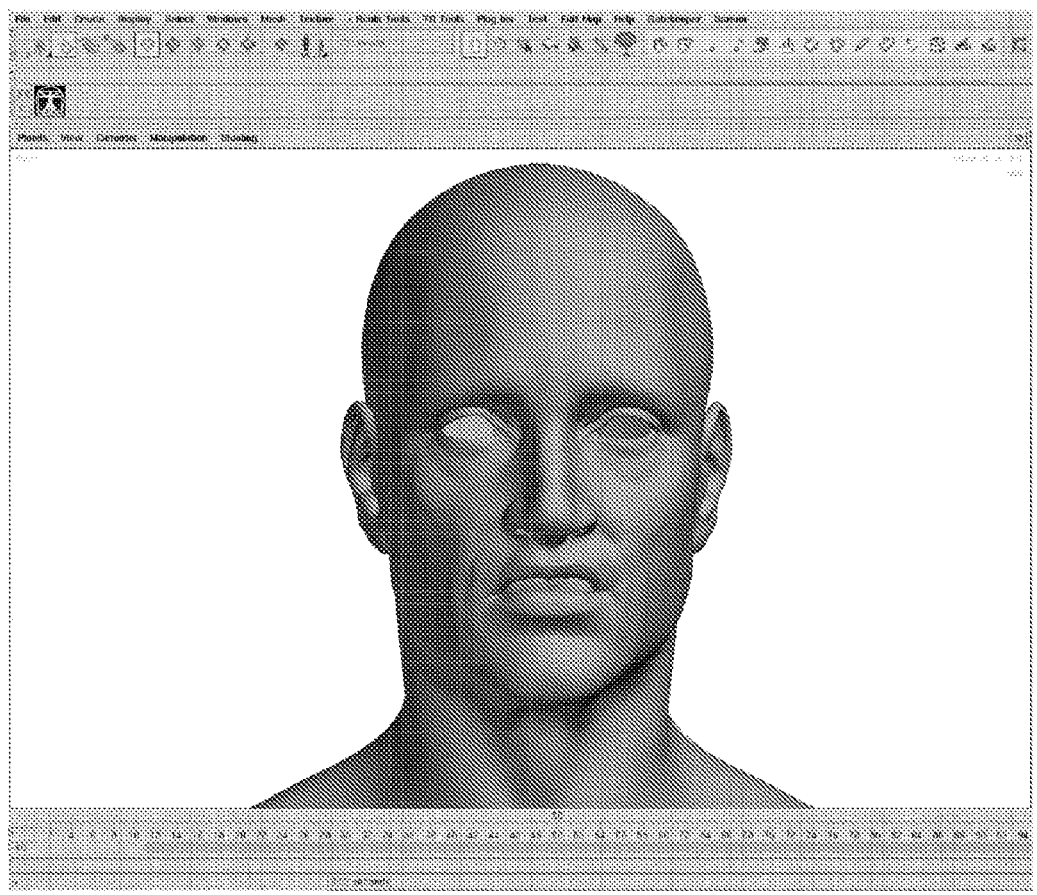

A user can correct the transferred attributes using the graphical user interface. For example, a user can select regions of the target model that have been incorrectly mapped as shown in FIG. 3E and apply a global interpolation algorithm to the selected regions. In some implementations, the algorithm may be Laplacian based. The interpolation algorithm can use the mesh topology to interpolate surface attribute values from correctly mapped surface attributes surrounding the selected regions. The result of applying the interpolation algorithm is shown in FIG. 3F.

Figure 3H:
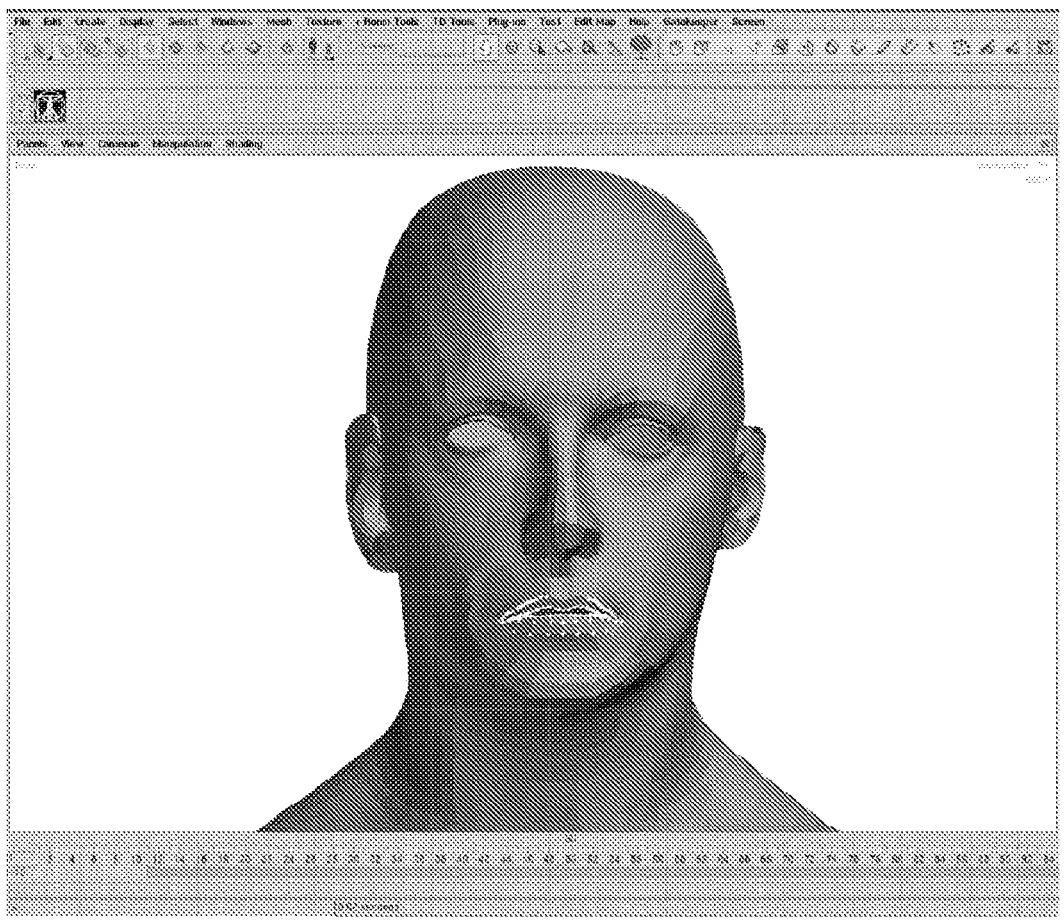
Figure 3I:
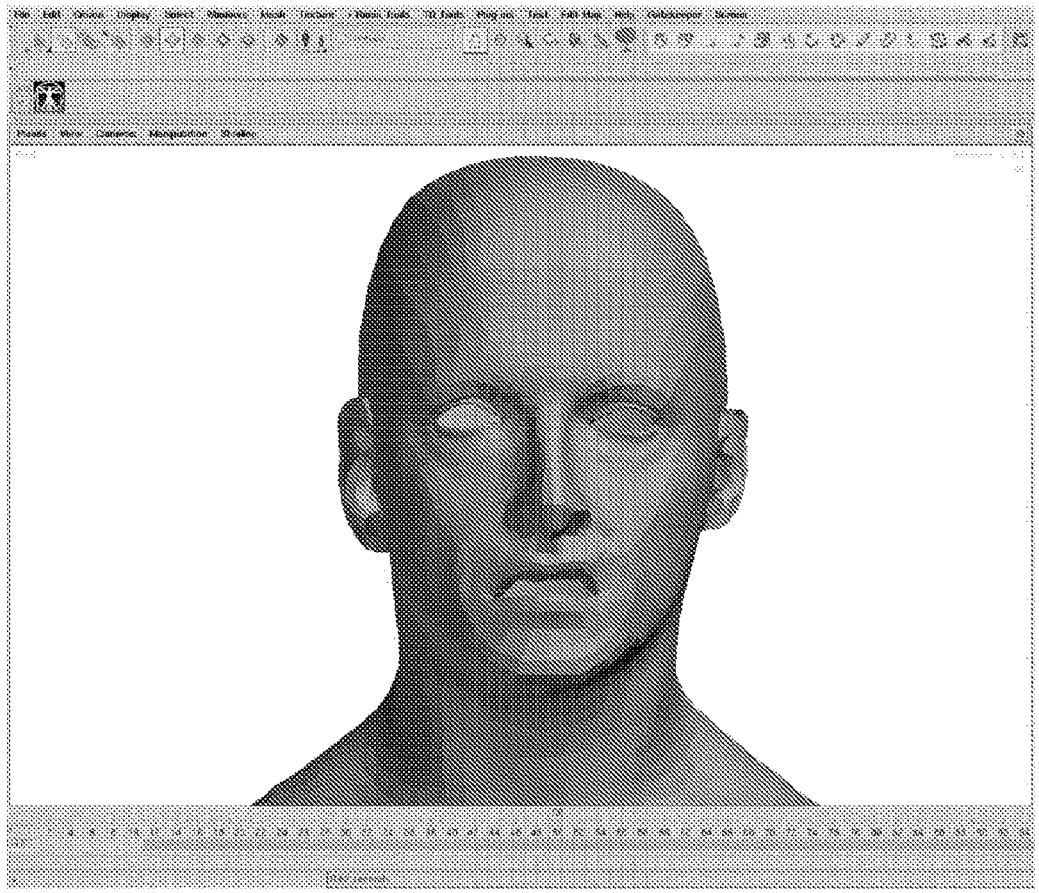

The corrected surface attributes can be used to update the surface map in the selected regions. The correspondences between the models can be recalculated and stored in the surface map. In some implementations, updating the surface map automatically corrects other surface attributes in the selected regions. For instance, if a user attempts to transfer another expression (e.g., the neutral expression 305 or the disgust expression 320 shown in FIG. 3G), the updated surface map will contain the correct mapping for the selected region, facilitating transfer of the expression. FIGS. 3H and 3I show the results of the surface attribute transfer to the target model for the neutral expression 305 and disgust expression 320, respectively.

Figure 4A:
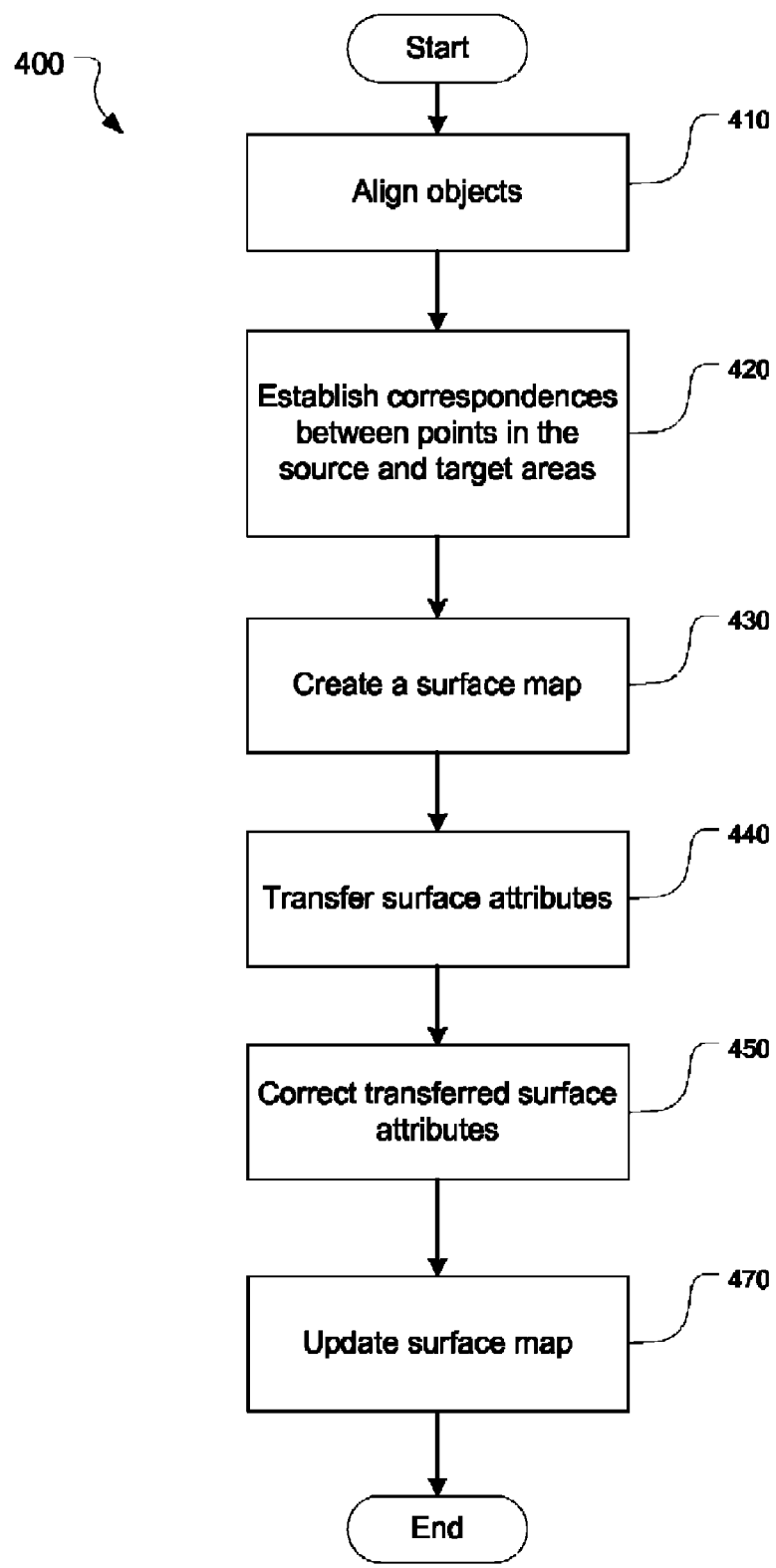
FIGS. 4A-4B are flow charts of an example process for transferring surface attributes across geometric models.
Figure 4B:
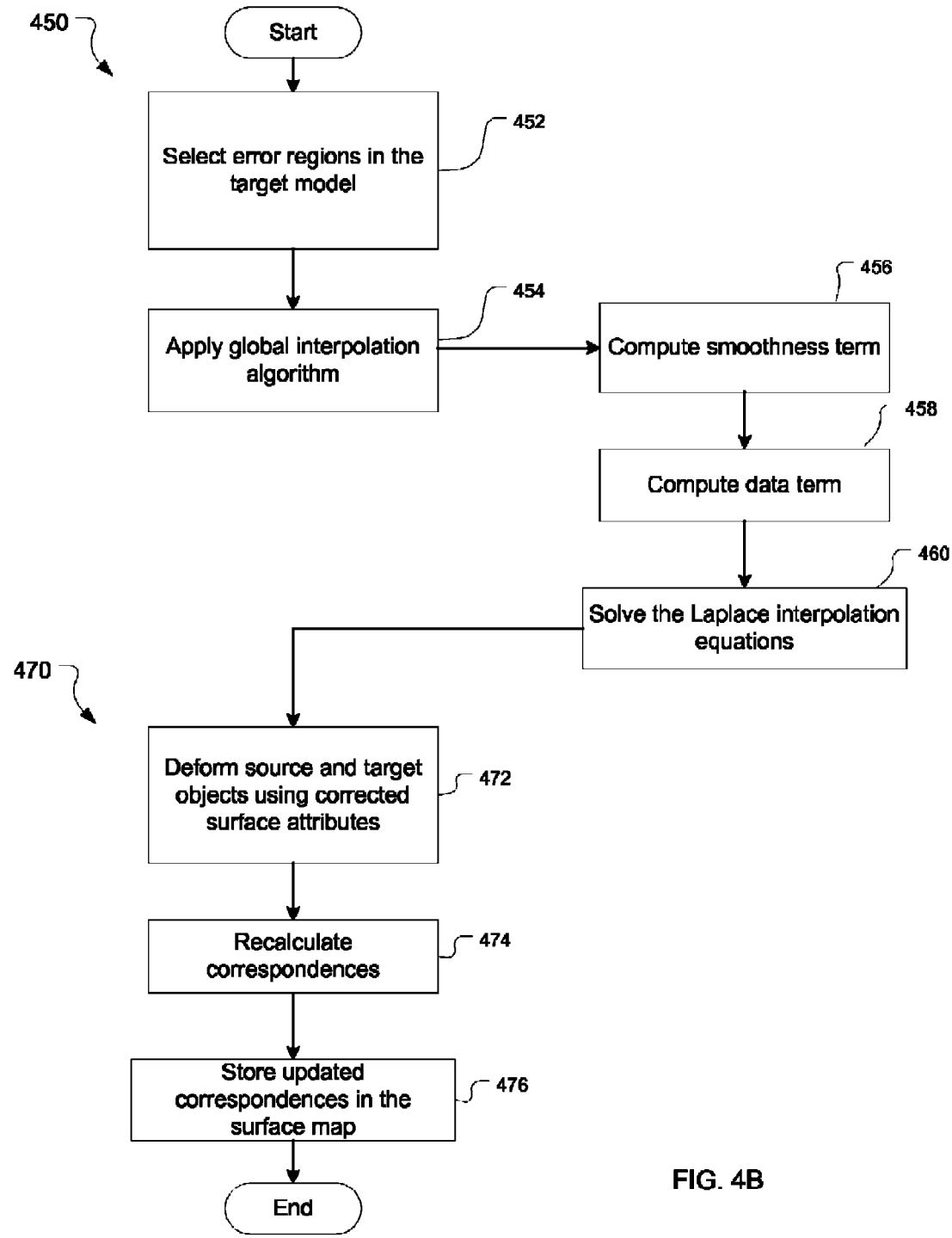

FIGS. 4A-4B are flow charts of an example process 400 for transferring surface attributes across geometric models. The process 400 may be performed, for example, by a system such as 200 and, for clarity of presentation, the description that follows uses the system 200 as the basis of an example for describing the process. However, another system, or combination of systems, may be used to perform the process 400.

Referring to FIG. 4A, the method 400 begins at step 410 where the source and target models are aligned. For example, the correspondence generator 205 can automatically align the source and target models by superimposing the models or, in some implementations, a user can interactively align the models using a graphical user interface. Next, at step 420, correspondences are established between points in the source and target models. As discussed above, for each vertex in a target model, a correspondence generator 205 can use a distance-based algorithm to calculate the closest vertex or surface point in the source model. Subsequently, a surface map is created at step 430. For example, the correspondence generator 205 may store the correspondences determined in step 420 in a data structure in the surface map repository 210.

Next, the method 400 proceeds to step 440 where surface attributes are transferred. Using the correspondences stored in the surface map, the attribute transfer module 210 can linearly blend the surface attributes of source model vertices that correspond to a vertex in the target model and copy the blended attribute to that target model point. In some cases, when there is a one-to-one correspondence between source and target vertices, the transfer module 210 can directly copy the surface attributes from the source vertices to the target vertices.

After the surface attributes have been transferred at step 440, erroneously transferred surface attributes may be corrected at step 450. In some implementations, a user may use the attribute editor 225 to correct the transferred attributes by selectively applying a global interpolation algorithm. The correction of erroneously transferred attributes will be discussed in detail in reference to FIG. 4B.

Once the transferred surface attributes have been corrected, the method proceeds to step 470 where the surface map is updated. In an illustrative example, the surface map updater 230 can update the surface map using the corrected surface attributes. Updating the surface map will be discussed in detail in reference to FIG. 4B.

FIG. 4B illustrates exemplary methods 450 and 470 for correcting erroneously transferred surface attributes and updating a surface map. The method begins at step 452 where a user selects error regions in the target model. For example, as illustrated in FIG. 1, the automatic distance-based algorithm may incorrectly map points in the source model to points in the target model. The user may select these incorrectly mapped points using a graphical user interface that displays the results of the mapping generated in step 430.

After the erroneously transferred surface attributes have been selected at step 452, a global interpolation algorithm is applied at step 454. In an illustrative example, the global interpolation algorithm can be Laplacian based. The global interpolation algorithm can correct erroneously transferred attributes by using the target mesh topology to interpolate values from neighboring regions of the target mesh that have correctly transferred surface attributes. The interpolation algorithm can include two terms: a smoothness term that can regularize a linear system of interpolated attributes in the target mesh, and a data term that uses the neighbors whose attributes were transferred correctly. For example, at step 456 the smoothness term can be calculated. In some implementations, to compute the smoothness term a cost function can be implemented to minimize the difference in the attribute values between the selected vertices and their neighbors in the model topology. The cost at a vertex i can be calculated as the difference between the value at that vertex and a weighted sum of the values at its neighbors using the following cost function:

$$\left\| y_i - \sum_{j \in N(i)} w_{ij} y_j \right\|_2^2$$

where $y_i$ is the attribute value at vertex i, $y_j$ are the attribute values at vertex i's neighbors (whose values may be known or unknown), and $w_{ij}$ is a weighting function matrix such that $$\sum_j w_{ij} = 1$$

for all i. The illustrative example uses the ratio of edge lengths (L) from each vertex to each vertex's neighbor j for the weighting function, i.e, $$w_{ij} = \frac{L_{ij}}{\sum L_{ij}}$$

In the illustrative example, the smoothness term is computed for all vertices in the selected region of the target mesh. Solving for the interpolated attribute values for the selected vertices $y_i$ reduces to the following least squares problem, which can be written as $\arg \min \|\Delta y - 0\|_2^2$, where $\Delta y$ is a graph Laplacian with $\Sigma^w{}_{ij}$ on the diagonal and $-w_{ij}$ off the diagonal. Differentiated and set to zero, the equation becomes $\Delta y = 0$.

Note that several vertices in the above least squares system may have valid attribute values. At step 458, the data term is computed using these valid attribute values. For example, a data term may be added to the smoothness term (arg min $\|\Delta y - 0\|_2^2$) equation, resulting in the following formula:

$$\arg \min(\|\Delta y - 0\|_2^2 + \alpha^2 \|y - \bar{y}\|_2^2)$$

where $\alpha$ can be a weight determining how the two terms $y - \bar{y}$ and $\Delta y - 0$ (i.e smoothness and data) are traded off. Put in matrix form, the equation looks like this:

$$\arg \min \left\| \begin{pmatrix} \Delta \\ \alpha I \end{pmatrix} y - \begin{pmatrix} 0 \\ \bar{y} \end{pmatrix} \right\|_2^2$$

where I is the identity matrix whose row and column size is equal to the number of columns of the matrix y.

The system of equations described above can be solved using a direct QR solver at step 460. For example, a Cholesky or LU solver can be used to solve the Laplacian equations. In an illustrative implementation, to achieve proper convergence a depth-first search can be performed to ensure that each vertex in the solved set can reach at least one vertex whose attribute value is known.

The method continues at step 472 where corrected surface attributes are used to deform source and target models. For example, corrected blend shape weights can be used to create a facial expression such as a yawn that can be applied to both the source and target meshes, causing the meshes to deform accordingly. Subsequently, at step 474 the correspondences between the updated source and target meshes are recomputed at the regions of incorrect mapping using a distance-based algorithm. As discussed above, either a Nearest Neighbor or Nearest Point on Surface algorithms can be used to calculate the correspondences. Finally, at step 476 the new correspondences are saved to the surface map and stored in the surface map repository 210.

Figure 5:
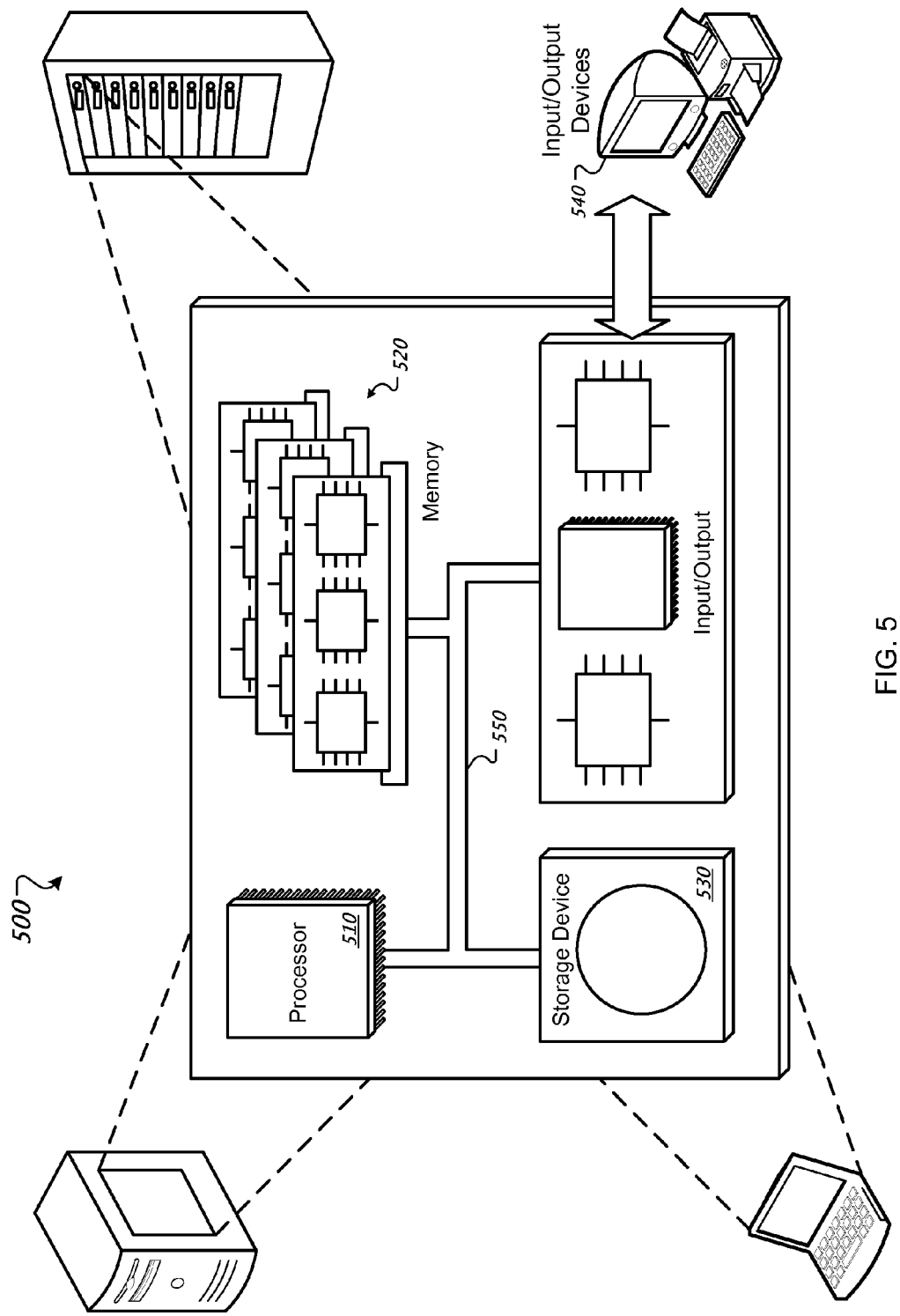
FIG. 5 is an exemplary schematic diagram of a computer system for transferring surface attributes across geometric models.

FIG. 5 is an exemplary schematic diagram of a computer system for transferring surface attributes across geometric models. The system 500 can be used for the operations described in association with any of the computer-implemented techniques and systems described previously, according to various implementations. For example, the system 500 can be used to implement the transfer of surface attributes across geometric models as described in FIGS. 4A-4B. The system 500 includes one or more processors 510, a memory 520, a storage device 530, and an input/output device 540. Each of the components 510, 520, 530, and 540 are interconnected using a system bus 550. The processor 510 is capable of processing instructions for execution within the system 500. The processor 510 is a single-threaded or multi-threaded processor having one or more processor cores. The processor 510 is capable of processing instructions stored in the memory 520 or on the storage device 530 to display graphical information for a user interface on the input/output device 540.

The memory 520 stores data in the system 500. For example, the memory 520 can be used to graphical user interface commands, surface attributes, surface maps, etc. The storage device 530 is capable of providing storage for the system 500. In one implementation, the storage device 530 is a computer-readable medium. In various different implementations, the storage device 530 can be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a cross-platform runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can in various implementations be performed by, and apparatus can in various implementations be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

While this specification contains many implementation details, these should not be construed as limitations on the scope of the invention or of what can be claimed, but rather as descriptions of features specific to particular embodiments of the invention. Certain features that are described in this specification in the context of separate embodiments can in various implementations be implemented in combination in a single embodiment. Conversely, various features that are described in the context of a single embodiment can in various implementations be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method, comprising:
determining a distance-based mapping between a set of points in a source object and a point in a target object, wherein the set of points in the source object includes at least one point;
storing the distance-based mapping in a surface map;
transferring surface attributes that determine an appearance or deformation of the set of points in the source object to the point in the target object using the surface map;
displaying at least a portion of the target object after the transfer;
receiving, from a human user, a selection of a region of the target object where the transfer of the surface attributes resulted in an error in an appearance or deformation of the target object; and
applying an interpolation algorithm that determines new values for surface attributes in the selected region from neighboring points in the target object in order to correct the error in the appearance or deformation of the target object.

2. The method of claim 1, further comprising:
applying the new surface attribute values to the source and target objects;
updating the distance-based mapping between the set of points in the source object and the point in the target object using the new surface attribute values; and
storing the updated distance-based mapping in the surface map.

3. The method of claim 1, wherein the interpolation algorithm uses Laplace interpolation.

4. The method of claim 1 wherein determining the distance-based mapping further comprises determining a closest vertex in the source object for each vertex in the target object.

5. The method of claim 1, wherein determining the distance-based mapping further comprises determining a closest point on a surface of the source object for each vertex in the target object.

6. The method of claim 1, wherein transferring surface attributes further comprises linearly blending the surface attributes that determine the appearance of the set of points in the source object.

7. The method of claim 1, wherein the source and target objects have different resolutions.

8. The method of claim 1, wherein the source and target objects have different topologies.

9. The method of claim 1, wherein the surface attributes are colors, UV coordinates, enveloping weights, or blend shapes.

10. A system, comprising:
a processor; and
a computer program product tangibly embodied in a computer readable storage device and comprising instructions that when executed cause the processor to generate:
a correspondence generator that determines a distance-based mapping between a set of points in a source object and a point in a target object and stores the distance-based mapping in a surface map, wherein the set of points in the source object includes at least one point;
an attribute transfer module that transfers surface attributes that determine an appearance or deformation of the set of points in the source object to the point in the target object using the surface map; and
an attribute editor that receives, from a human user, a selection of a region of the target object where the transfer of the surface attributes resulted in an error in an appearance or deformation of the target object and applies an interpolation algorithm that determines new values for surface attributes in the selected region from neighboring points in the target object in order to correct the error in the appearance or deformation of the target object.

11. The system of claim 10, further comprising:
a surface map updater that applies the new surface attribute values to the source and target objects;
updates the distance-based mapping between the set of points in the source object and the point in the target object using the new surface attribute values; and
stores the updated distance-based mapping in the surface map.

12. The system of claim 10, wherein the attribute editor uses a Laplacian-based interpolation algorithm.

13. The system of claim 10, wherein the correspondence generator determines the distance-based mapping by determining a closest vertex in the source object for each vertex in the target object.

14. The system of claim 13, wherein the correspondence generator uses a binary space partition tree to determine the distance-based mapping.

15. The method of claim 10, wherein the correspondence generator determines the distance-based mapping by determining a closest point on a surface of the source object for each vertex in the target object.

16. A computer program product tangibly embodied in a computer readable storage device, the computer program product including instructions that, when executed, perform operations for transferring surface attributes between graphical objects in a computer system, the graphical objects to be displayed on a display device, the operations comprising:
determining a distance-based mapping between a set of points in a source object and a point in a target object, wherein the set of points in the source object includes at least one point;
storing the distance-based mapping in a surface map;
transferring surface attributes that determine an appearance or deformation of the set of points in the source object to the point in the target object using the surface map;
displaying at least a portion of the target object after the transfer;
receiving, from a human user, a selection of a region of the target object where the transfer of the surface attributes resulted in an error in an appearance or deformation of the target object; and
applying an interpolation algorithm that determines new values for surface attributes in the selected region from neighboring points in the target object in order to correct the error in the appearance or deformation of the target object.

17. The computer program product of claim 16, further comprising:
applying the new surface attribute values to the source and target objects;
updating the distance-based mapping between the set of points in the source object and the point in a target object using the new surface attribute values; and
storing the updated distance-based mapping in the surface map.

18. The computer program product of claim 16, wherein the interpolation algorithm uses Laplace interpolation.

19. The computer program product of claim 16, wherein determining the distance-based mapping further comprises determining a closest vertex in the source object for each vertex in the target object.

20. The computer program product of claim 16, wherein determining the distance-based mapping further comprises determining a closest point on a surface of the source object for each vertex in the target object.

* * * * *

UNITED STATES PATENT AND TRADEMARK OFFICE
CERTIFICATE OF CORRECTION

| | | |
|---|---|---|
| PATENT NO. | : 8,112,254 B1 | Page 1 of 1 |
| APPLICATION NO. | : 12/113585 | |
| DATED | : February 7, 2012 | |
| INVENTOR(S) | : Kiran S. Bhat and Cary Phillips | |

It is certified that error appears in the above-identified patent and that said Letters Patent is hereby corrected as shown below:

Column 2, Line 1 (Other Publications), please delete "Atrributes" and insert -- Attributes --, therefor.

Column 12, Line 29 (Claim 15), please delete "method" and insert -- system --, therefor.

Signed and Sealed this
Twenty-fourth Day of April, 2012

David J. Kappos
*Director of the United States Patent and Trademark Office*